United States Patent [19]

Anttonen

[11] Patent Number: 5,014,844
[45] Date of Patent: May 14, 1991

[54] CONVEYOR BELT CLEANER

[75] Inventor: Raine Anttonen, Naavakatu, Finland

[73] Assignee: Ronde Engineering, Lahti, Finland

[21] Appl. No.: 242,305

[22] Filed: Sep. 9, 1988

[30] Foreign Application Priority Data

Sep. 14, 1987 [FI] Finland .................................. 873976

[51] Int. Cl.[5] ............................................. B65G 45/00
[52] U.S. Cl. ...................................... 198/499; 198/952
[58] Field of Search ............... 198/497, 499; 15/256.5, 15/256.6

[56] References Cited

U.S. PATENT DOCUMENTS

| 4,182,444 | 1/1980 | Fisher .................................. 198/499 |
| 4,359,150 | 11/1982 | Bowman et al. . |
| 4,529,084 | 7/1985 | Zhang . |
| 4,696,389 | 9/1987 | Schwarze ............................. 198/499 |
| 4,850,474 | 7/1989 | Schwarze ............................. 198/499 |

FOREIGN PATENT DOCUMENTS

| 0254977 | 2/1988 | European Pat. Off. ............ 198/499 |
| 3402407 | 7/1985 | Fed. Rep. of Germany ...... 198/499 |
| 3624754 | 1/1988 | Fed. Rep. of Germany ...... 198/499 |
| 2590243 | 5/1987 | France ................................. 198/499 |
| 0870289 | 10/1981 | U.S.S.R. .............................. 198/499 |

Primary Examiner—D. Glenn Dayoan
Attorney, Agent, or Firm—Nixon & Vanderhye

[57] ABSTRACT

A conveyor belt cleaner is disclosed which comprises a body with cleaner elements attached side by side to the body, each cleaner element consisting of a blade, a blade holder attached to the body and a torsion spring element located between the blade and the blade holder. The blade consists of an upper part which is pressed against the underside of the return belt of a conveyor belt and a lower part which is disposed at an angle relative to the upper part and attached to the torsion spring element. The blade is of uniform width from its lower edge to the upper edge which presses against the conveyor belt.

7 Claims, 3 Drawing Sheets

CONVEYOR BELT CLEANER

BACKGROUND OF THE INVENTION

The present invention relates to a conveyor belt cleaner comprising a body with cleaner elements attached side by side to the body, each cleaner element consisting of a blade, a blade holder attached to the body and a torsion spring element located between the blade and the blade holder.

The function of a belt cleaner is to dislodge and remove any material that may remain on a conveyor belt directly after rounding the drum at the discharge end of the conveyor so as to prevent the remnants of material from spreading all over the area under the conveyor. A disadvantage with previously known belt cleaners is the fact the material scraped off from the belt accumulates on the cleaner body, blade arms and torsion springs. In these cleaners, the blades are attached to an arm consisting e.g. of a round bar attached to a torsion spring mounted on the main body, or the blade arm itself may act as a spring, pressing the blade against the belt. Furthermore, the cleaners are generally so constructed that the cleaner blade is located on the trailing side of the body relative to the running direction of the return belt. This solution ensures smooth operation, but it has the drawback that the material removed from the belt accumulates directly on the blade arms, torsion springs and main body, causing malfunctions in the cleaner. In winter time, another problem which arises is that freezing and agglomeration of the material loan render the cleaner inoperable. As a consequence, frequent maintenance operations are required which also cause problems because the servicemen have had to work under the conveyor when replacing or cleaning blades or performing other maintenance operations. In consequence the conveyor must stand idle during the servicing, involving high expenses.

DESCRIPTION OF PRIOR ART

One previously known solution for a conveyor belt cleaner is that proposed by U.S. Pat. No. 4,529,084, in which the cleaner blade is attached to the upper end of a blade arm whose lower end is connected to a torsion spring element, which is attached to a supporting bar of a round sectional form at its outer end. The round end of the supporting bar is mounted on the cleaner body by means of an element that permits the bar to rotate about its longitudinal axis as well as about the longitudinal axis of the cleaner body. This arrangement allows adjustment of the position and pressure of the blade relative to the underside of the return belt, this being the main object of the prior invention. However, it has the disadvantage that the material scraped off from the belt falls directly onto the blade arms, torsion spring elements and cleaner body because of the short blades and the general construction of the cleaner.

Another previously known proposal for a conveyor belt cleaner is that described in U.S. Pat. No. 4,859,150, which teaches that the blade arm is a bent rod, the blade being attached to the upper end and the torsion spring element to the lower end of the arm. Besides the drawbacks mentioned, this cleaner is composed of many small parts, resulting in an expensive construction.

SUMMARY OF THE INVENTION

An object of the present invention is to mitigate or eliminate the drawbacks referred to above and create a conveyor belt cleaner that is reliable in operation, has a long servicing interval and is easy to maintain.

Accordingly, the invention provides a conveyor belt cleaner comprising a body and cleaner elements attached side by side to the body, each cleaner element consisting of a blade, a blade holder attached to the body and a torsion spring element located between the blade and the blade holder, the blade consisting of an upper part having an upper edge which is adapted to be pressed against the underside of the return belt of the conveyor belt and a lower part having a lower edge, which lower part is disposed at an angle relative to the upper part and attached to the torsion spring element, the blade being of uniform width from the lower edge to the upper edge thereof.

DETAILED DESCRIPTION OF THE INVENTION

In a preferred embodiment of the invention, the blade is made of one piece and the lower part of the blade is so inclined relative to the vertical plane that the material scraped off from the belt will gravitate down and from the blade surface.

The torsion spring element, blade holder and body are preferably located under the blades and (relative to the direction of movement of the return belt) on the trailing side thereof in such manner that the blades placed side by side constitute a continuous wall protecting the rest of the cleaner.

In another preferred embodiment of the invention, the blade is provided with lugs attached to the back of its lower part, said lugs being provided with mounting holes. The hole in at least one of the lugs is square in form, and the torsion spring element is provided with a hollow square tube passing through its center, the hole inside the tube being of the same form and dimensions as the mounting hole in the lug. The blade is mounted on the torsion spring element by means of a key bolt which, over part of its length, has a square sectional form corresponding to the mounting hole in the lug and the hole inside the square tube, so that the bolt fits tightly therein.

An advantage of the construction employed in the invention is that the blades, having uniform width over their entire length, form a protective wall that prevents the removed material from falling onto the other parts of the cleaner, which (relative to the running direction of the belt) are located on the trailing side of the blades. A further advantage is the inclined blade position, which, combined with the cleaner geometry and the belt motion, produces vibrations in the blades, thus rendering their scraping action more effective and helping the material slide downwards along the blade surface This makes it unnecessary to use a separate vibrator to loosen the material from the underside of the return belt or from the other part of the cleaner as these remain free of the scrapings. The result is a cost-saving cleaner.

In a further preferred embodiment of the invention, the blades are provided with a heating element, such as an electric heating cable, which is attached to the sheltered rear surface of the blades. This provides the advantage that the cleaner can be kept dry and free of ice in wintry and wet conditions. In a cleaner constructed as provided by the invention, the heating cable can be mounted where heat is really needed, i.e. in the upper and lower parts of the blade, along which the scrapings slide down. In the previously known cleaners of this type, it is practically impossible to place heating cables on the blades or blade arms, because they are unprotected and, due to their geometry, subject to large displacements. Similarly, a cable mounted on the main body will only heat the body but not the blades and blade arms where freezing is a problem. In such arrangements, heating of the blades and blade arms is inhibited by the torsion spring element, which is usually made of an insulating material, such as rubber. If the blade arms are made of spring steel, the heat losses in the thin arms are so large that the blades cannot receive enough heat. Alternatively, if the blade arms are made of an elastomer, the low heat conductivity of the elastomer inhibits the transfer of heat from the body to the blades.

According to a further preferred embodiment of the invention, the sheltered outer side of the blade is provided with a shield pipe for the heating cable, the pipe being so positioned that its ends at the blade edges are on the same horizontal axis as the centers of the torsion spring elements, with the pipe ends slightly retracted from the blade edges. This provides the advantage that the heating element is protected and can be easily mounted. Since the middle and lower parts of the blades are of a flat form, there is enough space on their outer side, i.e. rear side, to accommodate e.g. a flexible, self-adjusting heating cable To achieve a more effective heat transfer and longer life, the cable is passed from one blade to the next in line with the centers of the torsion spring elements. The cable is thus protected against damage, since it is only subject to a slight torsion at the axis of torsion of the spring elements and to no shear at all.

In a still further preferred embodiment of the invention, the blade holder of each cleaner element is provided with connectors for the supply of electricity to the heating cable. This provides the advantage of reliable heating, because each blade can be provided with a short cable of its own. The electricity required for the heating is obtained from a branching box mounted on the conveyor frame, and the energy can be easily distributed over the whole width of the cleaner.

BRIEF DESCRIPTION OF THE DRAWINGS

Further objects, features and advantages of the invention will become apparent to those skilled in the art from the following description thereof when taken in conjunction with the accompanying drawings, in which.

DESCRIPTION OF THE PREFERRED EMBODIMENTS

Figure 1:
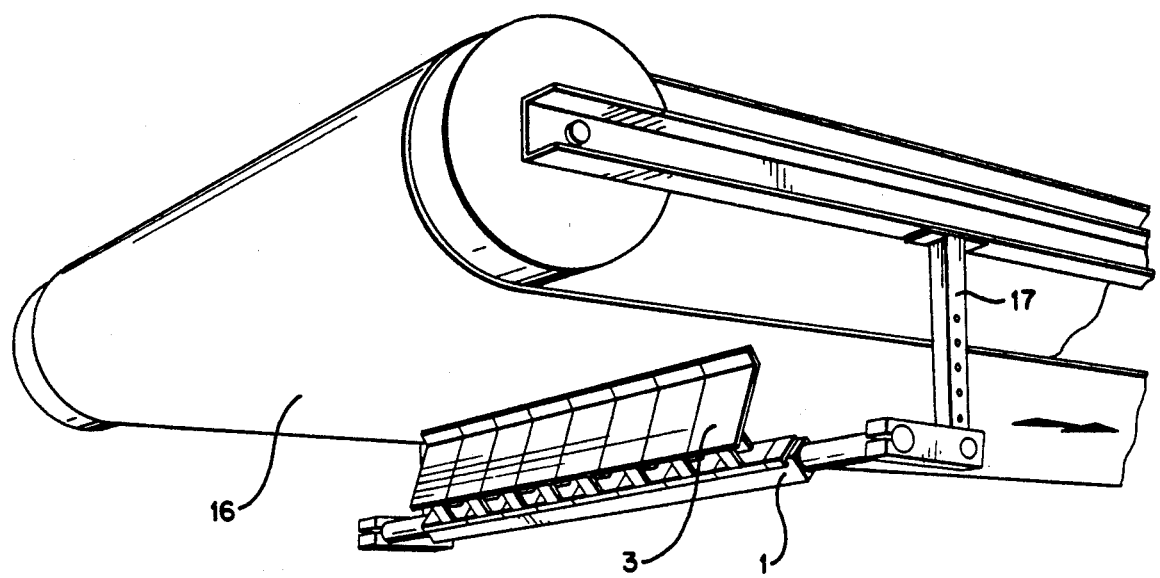
FIG. 1 shows a perspective view of a belt cleaner as seen from an oblique angle from below and from the front.

Referring now to the drawings, the basic component of the cleaner is a body 1, which is disposed below a conveyor belt in a transverse position relative to its running direction. The body 1 is adjustably mounted on the frame of the conveyor. The adjustment is carried out simply by changing the mounting hole in a mounting rack 17. The body can be rotated about its longitudinal axis to adjust the pressure of the blade against the conveyor belt. For this adjustment several mechanisms are available, but these will not be described here.

The body consists e.g. of a bar of a length somewhat exceeding the width of the conveyor belt, the middle portion of the bar having a square sectional form while the ends are of rounded section. The body accommodates a number of blade holders 4 which are mounted on the body 1 by bending the lower end of the blade holder around the square part of the square bar 1 so that it covers three of the corners of the bar. The result is a sturdy and simple mounting arrangement.

The lower part of the blade holder 4 is somewhat wider than the blade itself to ensure that the blades will not rub against one another. At the upper end of the blade holder 4 is a torsion spring element 5 of a known construction, which is non-rotatably mounted inside the arm of the blade holder. The blade holder 4 is mounted in an inclined position in such manner that its upper end points in a direction opposite to the running direction of return belt 16 of the conveyor belt. The angle of inclination is about 45°. A cleaner blade 3 is attached to the torsion spring element 6. Attached to back 10 of a lower part 9 of the blade are two mounting lugs 11, which also serve to make the blade structure more rigid. The mounting holes 21 in the lugs are square in form.

At the fulcrum, i.e. in the middle of the rubber springs, of the torsion spring element 5 is a square tube 12 the outer dimensions of which are such that it only allows the slight torsional motion required by the spring element. The hole 100 inside the square tube 12 corresponds in form and dimensions to the mounting holes in the lugs 11. The blade is attached to the torsion spring element 5 by means of a key bolt 13 inserted through the mounting holes 21 and the square tube 12. The part of the bolt 13 which extends inside the holes is of a square sectional form and fits non-rotatably in the holes.

Figure 2:
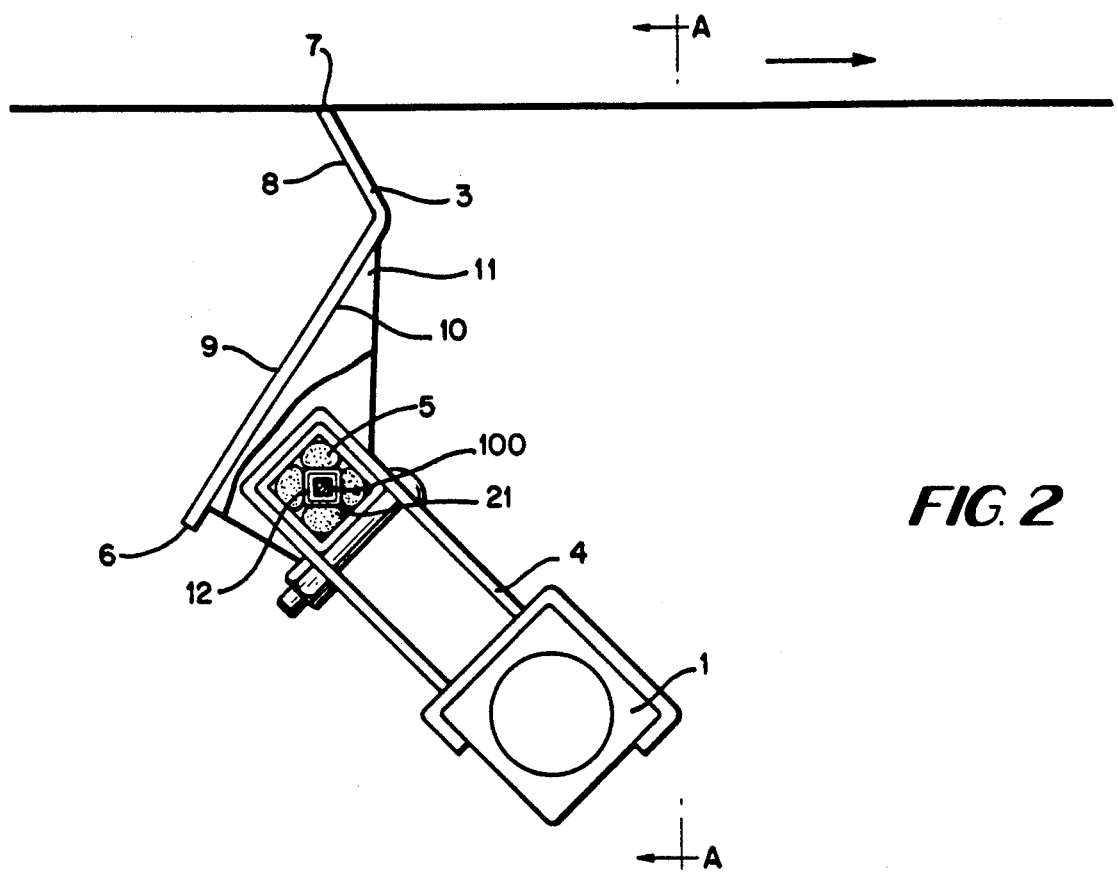
FIG. 2 is a diagrammatic side view of the belt cleaner.
Figure 3:
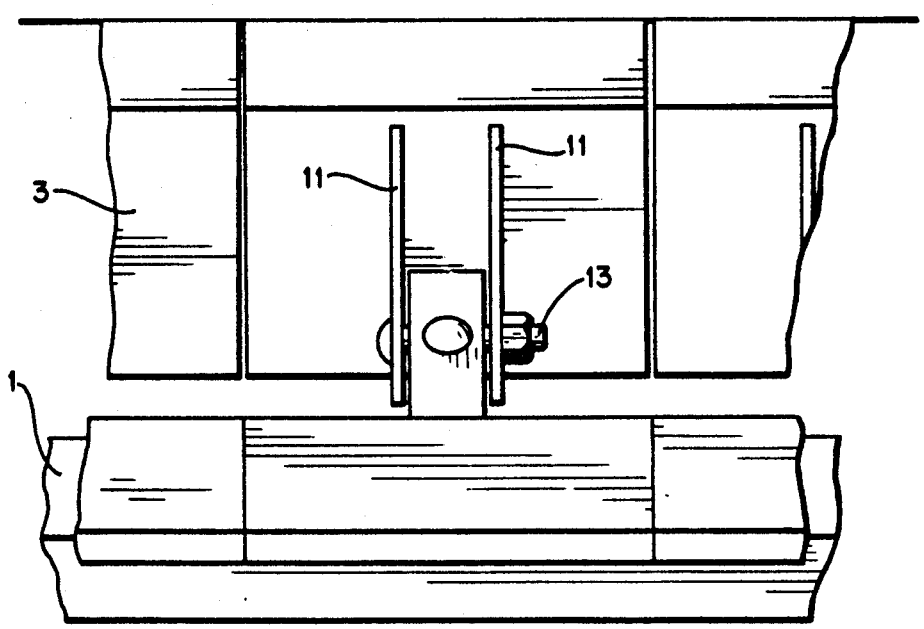
FIG. 3 is a fragmentary view of the belt cleaner in a simplified form, seen from direction A in FIG. 2.
Figure 4:
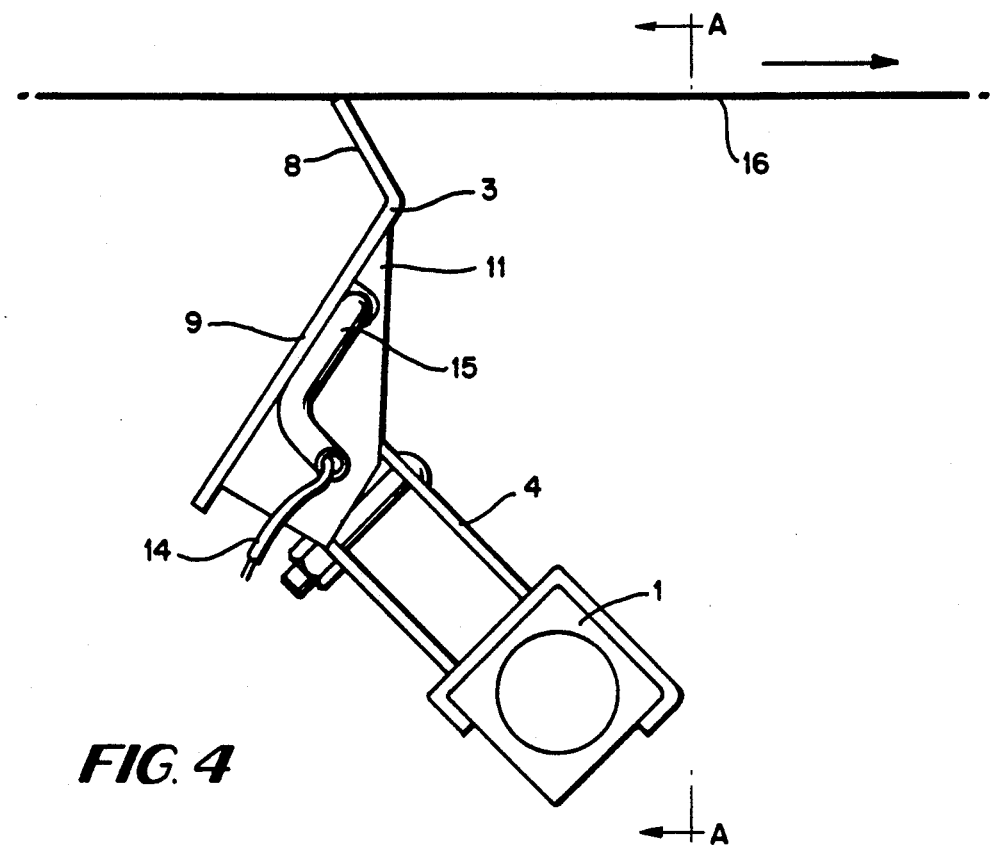
FIG. 4 shows a simplified side view of a belt cleaner provided with a heating cable.
Figure 5:
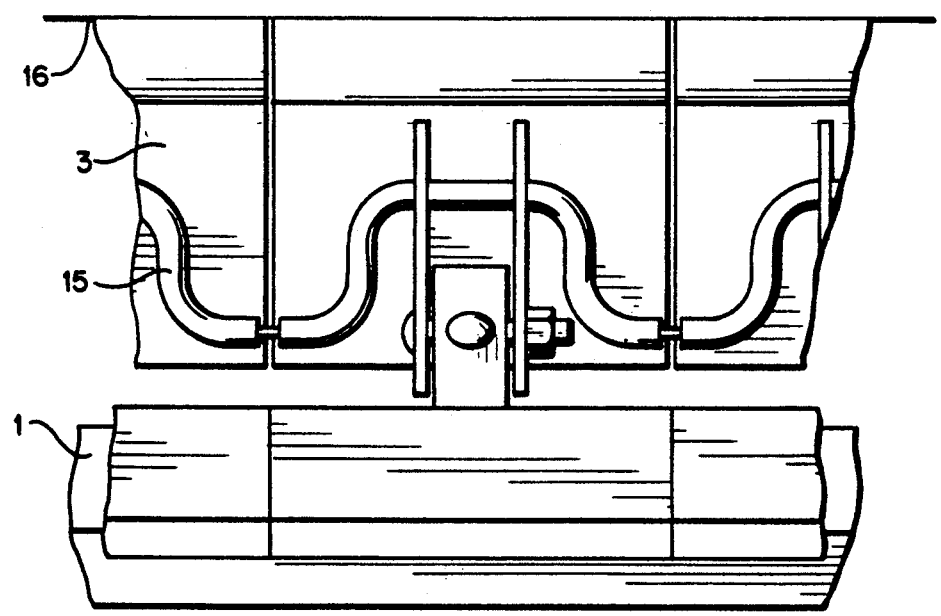
FIG. 5 is a fragmentary view of the cleaner of FIG. 4, seen from direction A in FIG. 4.

The blade consists of two planar parts of equal width, which are bent into an angle relative to each other in such manner that the blade, when mounted in place, constitutes a continuous sliding surface for the material removed from the belt. Topmost part 8 is the blade proper and is removably mounted, while the lower part 9, disposed at an angle relative to the upper part 8, acts as a sliding surface and blade arm. The torsion spring element is so adjusted that the spring force presses an upper edge 7 of the blade against the underside of the return belt 16, so that the blade tends to rotate in a direction opposite to the running direction of the return belt 16, i.e. in an anti-clockwise direction in the arrangement depicted in FIGS. 2 and 4. The location of the point of contact between the upper edge 7 of the blade and the belt 16 is chosen so as to produce an optimal horizontal distance between the point of contact and the fulcrum of the torsion spring element 5, so as to ensure that an optimal blade pressure from the correct direction is applied to the belt Moreover, the inclination of the lower part 9 of the blade is suitably adjusted to ensure an optimum self-cleaning property of the blade.

In a cleaner constructed as described above, the torsion springs 5, blade holders 4 and body 1 are located under a protective wall formed by the blades 3, so that the material scraped off from the belt will slide down along the front surfaces of the blades while the abovementioned parts 4, 5 are safe from this flow of material.

As seen from the servicing access direction, the last blade holder 4 is provided with a piece of rope with which the cleaner elements 2 can be pulled off from the supporting bar 1. When one pulls at the rope, all the cleaner elements will move and can be removed one by one as they come onto the round end of the body bar 1. This makes it easy to remove the cleaner element to be serviced or repaired, and the necessary operations can be carried out without service personnel having to work under the conveyor belt. The cleaner is reassembled by setting the elements one after the other onto the bar 1 in the reverse order and pushing them together along the bar until the element at the outer edge is in place.

For use with conveyors operated in wintry or wet conditions, the cleaner blades 3 are provided with a shield pipe 15 for a heating cable 14, disposed on the sheltered rear side !0 of the blades 8. When necessary, a heating cable can be easily mounted inside the pipe. The pipe 15 may be bent into any shape, but the main idea is to provide each blade with as long a part of the heating cable as possible. At both edges of the blade, the shield pipe runs downward and is bent out toward the end of the pipe on the adjacent blade. The pipe ends are slightly spaced apart from the side edges of the blades to provide a clearance between the pipes on adjacent blades. In addition, the pipe ends bent out to the sides are so located that their central axis is in line with the fulcrum of the torsion spring elements 5, thus minimizing the strain imposed on the heating cable !4 at the points of cross-over between blades.

It is also possible to provide each blade holder with connectors for the supply and distribution of energy from blade to blade, the connectors being placed on the lower parts of the blades. In this case the conveyor frame is provided with a branching box from which electricity is supplied to the blade holder located on that side from which the cleaner is accessed for service. This arrangement makes it possible to provide each blade with a separate short heating cable, which is connected to the connectors on the blade holder, so that each cable constitutes a link in a chain of cables. This provides the advantage that a damaged cable can be easily replaced by a new one, since only the damaged link of the cable chain has to be replaced and reconnected to the rest of the chain.

Figure 6:
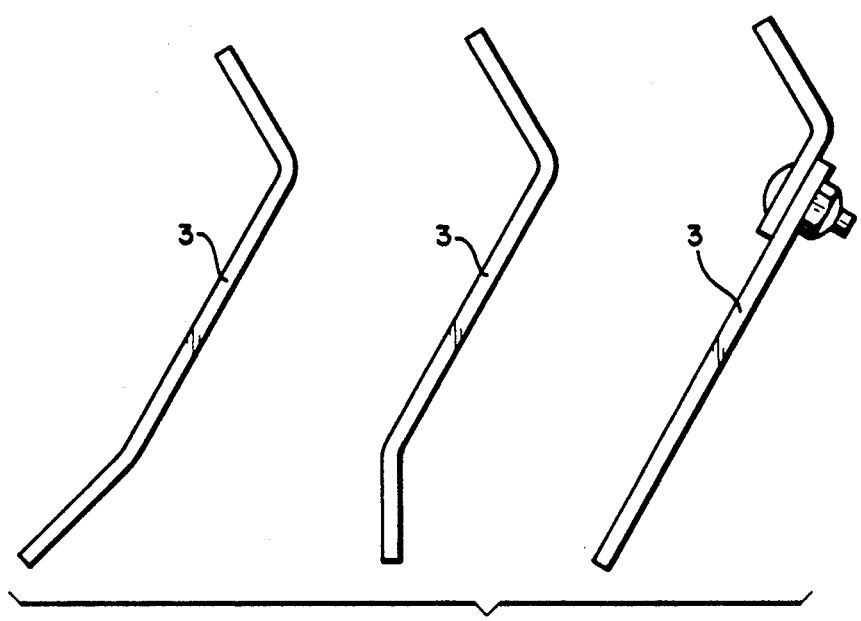
FIG. 6 shows several embodiments of blade profile.

It will be obvious to a person skilled in the art that different embodiments of the invention may be envisaged and that the invention is not restricted to the examples discussed above, but may instead be varied within the scope of the following claims. Thus, for example, the upper and lower parts of the blade may consist of separate plates attached together by means of e.g. screws to facilitate replacement as shown in FIG. 6. Similarly, instead of a heating cable, other types of heating element may be used, such as heating plates or bars. The heating cables may also be mounted using other means that shield pipes. Also, the blade profile may be varied as required by the equipment used in each case, examples of different profiles being shown in FIG. 6.

I claim:

1. A conveyor belt cleaner comprising a body and cleaner elements attached side by side to the body, each cleaner element consisting of a blade, a blade holder attached to said body, a torsion spring element located between said blade and said blade holder, and heating element means disposed in contact with each said blade, each said blade consisting of an upper part having an upper edge which is adapted to be pressed against the underside of a return belt of a conveyor belt, and a lower part having a lower edge, which lower part is disposed at an angle relative to said upper part and attached to said torsion spring element, each said blade being of uniform width from the lower edge to the upper edge thereof, and each said blade having a sheltered rear surface, said heating element means disposed i contact with said sheltered rear surface of each said blade.

2. A conveyor belt cleaner according to claim 1, wherein the blade is made in one piece and the lower part of said blade is so inclined, in operation, relative to vertical that material scraped off from said belt will gravitate down and away from said blade.

3. A conveyor belt cleaner according to claim 1, wherein said sheltered rear surfaces of said blades constitute a continuous wall and said torsion spring element, blade holder, heating element means and body are protected from material scraped off from said belt by being located under said sheltered rear surfaces of said blades and, relative to the direction of movement of said return belt, on the trailing side of said sheltered rear surfaces of said blades.

4. A conveyor belt cleaner comprising a body and cleaner elements attached side by side to the body, each cleaner element consisting of blade, a blade holder attached to said body and a torsion spring element located between said blade and said blade holder, said blade consisting of an upper part having an upper edge which is adapted to be pressed against the underside of the return belt of a conveyor belt and a lower part having a lower edge, which lower part is disposed at an angle relative to said upper part and attached to said torsion spring element, said blades being of uniform width from the lower edge to the upper edge thereof, and heating element means being disposed in contact with a sheltered rear surface of each said blade, and wherein said blades are provided with shield pipes for said heating element means, said shield pipes being attached to the sheltered rear surfaces of said blades, the ends of said pipes at the side edges of said blades being aligned with the centers of said torsion spring elements and slightly spaced apart from said side edges of said blades.

5. A conveyor belt cleaner according to claim 4, wherein said heating element means is an electric heating cable.

6. A conveyor belt cleaner comprising a body and cleaner elements attached side by side to said body, each cleaner element consisting of a blade, a blade holder attached to said body and a torsion spring element located between said blade and said blade holder, said blade consisting of an upper part having an upper edge which is adapted to be pressed against the underside of the return belt of a conveyor belt and a lower part having a lower edge, which lower part is disposed at an angle relative to said upper part and attached to said torsion spring element, said blade being of uniform width from the lower edge to the upper edge thereof and wherein said blade is provided with lugs attached to the rear surface of said lower part, a mounting hole in at least one of said lugs being square in form, and said torsion spring element being provided with a square tube having a hollow interior passing through the center thereof, said hollow interior of said tube being of the same form and dimensions as said mounting hole in each of said lugs, said blade being mounted on said torsion spring element by means of a key bolt which, over part of its length, has a square sectional form corresponding to said mounting hole in said lug and said hollow interior of said tube so that said bolt fits tightly therein.

7. A conveyor belt cleaning arrangement of the type for cleaning a conveyor belt having a belt return surface, said arrangement comprising:
- an elongated member mounted in proximity to said belt return surface; and
- plural cleaner elements mounted side by side to the elongated member, each cleaner element including:
- a blade including an upper part having an upper edge, and a lower part having a lower edge, said lower part being disposed at an angle relative to said upper part,
- a blade holder disposed on said elongated member and
- torsion spring element means located between said blade and said blade holder and attached to said blade lower part, said torsion spring element means for pressing said blade upper edge against said return belt surface,
- and wherein said blade lower portion includes means for defining at least one square hole; and
- said torsion spring element means includes a hollow elongated tube having a central hollow cavity dimensioned and shaped in cross-section to correspond with said square hole.

* * * * *